(12) United States Patent
Mainali et al.

(10) Patent No.: US 10,642,530 B2
(45) Date of Patent: *May 5, 2020

(54) GLOBAL OCCUPANCY AGGREGATOR FOR GLOBAL GARBAGE COLLECTION SCHEDULING

(71) Applicant: MICROSOFT TECHNOLOGY LICENSING, LLC, Redmond, WA (US)

(72) Inventors: Shane Kumar Mainali, Duvall, WA (US); Rushi Srinivas Surla, Kenmore, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/280,403

(22) Filed: Feb. 20, 2019

(65) Prior Publication Data

US 2019/0179565 A1    Jun. 13, 2019

Related U.S. Application Data

(63) Continuation of application No. 15/640,210, filed on Jun. 30, 2017, now Pat. No. 10,241,716.

(51) Int. Cl.
*G06F 12/00* (2006.01)
*G06F 3/06* (2006.01)
*G06F 12/02* (2006.01)

(52) U.S. Cl.
CPC .......... *G06F 3/0652* (2013.01); *G06F 3/0604* (2013.01); *G06F 3/067* (2013.01); *G06F 3/0608* (2013.01); *G06F 12/0238* (2013.01); *G06F 12/0246* (2013.01); *G06F 12/0253* (2013.01); *G06F 12/0276* (2013.01); *G06F 2212/1044* (2013.01); *G06F 2212/7205* (2013.01)

(58) Field of Classification Search
None
See application file for complete search history.

(56) References Cited

U.S. PATENT DOCUMENTS

| 10,248,562 | B2 | 4/2019 | Mainali et al. |
| 2019/0004943 | A1 | 1/2019 | Mainali et al. |
| 2019/0227928 | A1 | 7/2019 | Mainali et al. |

*Primary Examiner* — Midys Rojas
(74) *Attorney, Agent, or Firm* — Workman Nydegger

(57) ABSTRACT

Computer systems and methods for scheduling garbage collection in a distributed environment that includes multiple partitions that reference various data blocks that store data objects. A global occupancy aggregator may access occupancy information for each of the partitions from an occupancy index of each of the partitions. This occupancy information specifies a portion of storage resources occupied by those data blocks referenced by each of the partitions. The global occupancy aggregator may aggregate the accessed occupancy information to generate a global occupancy index that combines the occupancy information of the partitions. The global occupancy aggregator may generate a global schedule for garbage collection for the partitions based on the global occupancy index. The global schedule specifies which of the data blocks included in the global occupancy index are to be subjected to garbage collection.

20 Claims, 5 Drawing Sheets understand # GLOBAL OCCUPANCY AGGREGATOR FOR GLOBAL GARBAGE COLLECTION SCHEDULING

CROSS-REFERENCE TO RELATED APPLICATIONS

This application is a continuation of U.S. patent application Ser. No. 15/640,210 filed on Jun. 30, 2017, entitled "GLOBAL OCCUPANCY AGGREGATOR FOR GLOBAL GARBAGE COLLECTION SCHEDULING," which application is incorporated herein by reference in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

For instance, cloud computer services that include databases and tables implemented across various computer systems are becoming increasingly popular. Furthermore, cloud databases and tables often include hundreds of thousands, or even millions of databases/tables, each of which may comprise terabytes or more of data. Accordingly, storage efficiency, especially in relation to backups can be crucial in the management of such systems. For instance, many cloud computer services offer subscribers the ability to store particular data within provided tables. As the data is written to and then deleted from the tables, garbage collection operations are often needed so that storage space may be recovered. However, garbage collecting can come at a large cost to the cloud computer services in the form of large, and oftentimes inefficient, uses of resources.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems and method for scheduling garbage collection in a distributed environment that includes multiple partitions that reference various data blocks that store data objects. A global occupancy aggregator may access occupancy information for each of the partitions from an occupancy index of each of the partitions. This occupancy information specifies a portion of storage resources occupied by those data blocks referenced by each of the partitions. The global occupancy aggregator may aggregate the accessed occupancy information to generate a global occupancy index that combines the occupancy information of the partitions. The global occupancy aggregator may generate a global schedule for garbage collection for the partitions based on the global occupancy index. The global schedule specifies which of the data blocks included in the global occupancy index are to be subjected to garbage collection.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein are related to computing systems and method for scheduling garbage collection in a distributed environment that includes multiple partitions that reference various data blocks that store data objects. A global occupancy aggregator may access occupancy information for each of the partitions from an occupancy index of each of the partitions. This occupancy information specifies a portion of storage resources occupied by those data blocks referenced by each of the partitions. The global occupancy aggregator may aggregate the accessed occupancy information to generate a global occupancy index that combines the occupancy information of the partitions. The global occupancy aggregator may generate a global schedule for garbage collection for the partitions based on the global occupancy index. The global schedule specifies which of the data blocks included in the global occupancy index are to be subjected to garbage collection.

There are various technical effects and benefits that can be achieved by implementing aspects of the disclosed embodiments. By way of example, it is now possible to determine a global occupancy index for data block that are referenced by various different partitions. It is further possible to use the global occupancy index to generate a global schedule for garbage collection. This provides for more efficient garbage collection and duplicate garbage collection is minimized, thus saving on system resources. Further, the technical effects related to the disclosed embodiments can also include improved user convenience and efficiency gains.

Some introductory discussion of a computing system will be described with respect to FIG. 1. Then scheduling garbage collection in a distributed environment that includes a plurality of partitions that reference a plurality of data blocks that store data objects will be described with respect to FIGS. 2 through 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
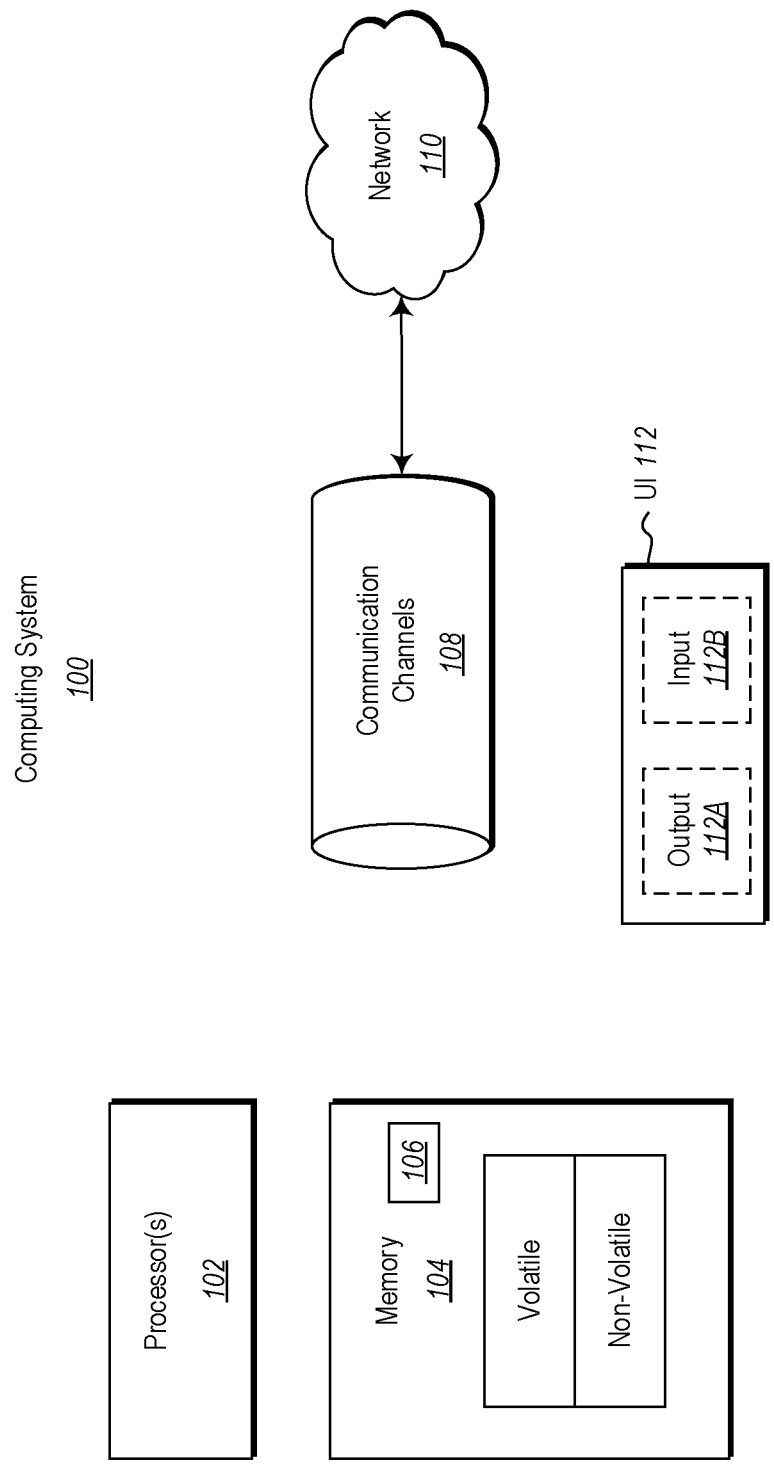
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
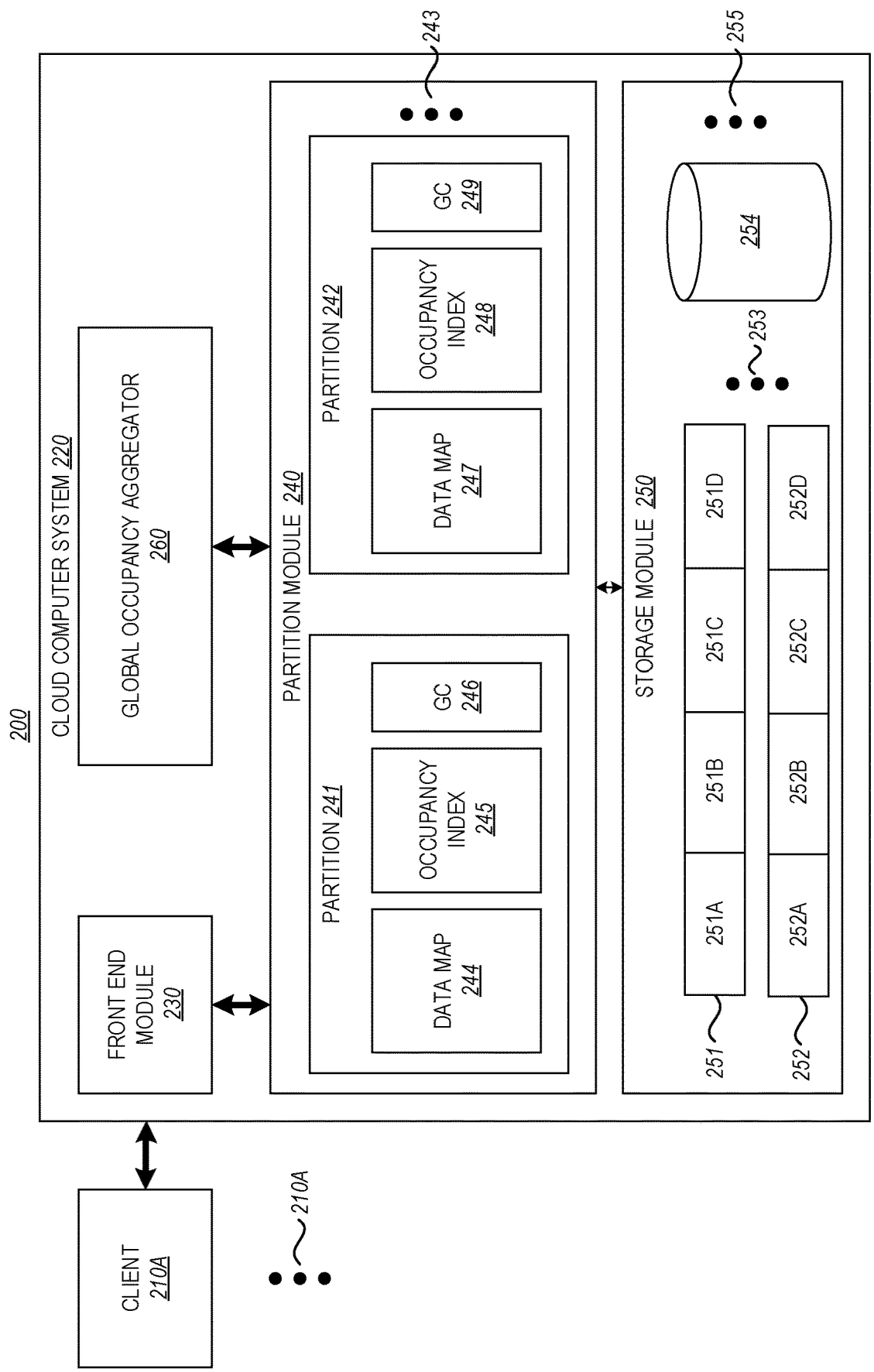
FIG. 2 illustrates an example cloud computer system that allows global scheduling of garbage collection in accordance with the principles described herein.

FIG. 2 illustrates a computer environment 200 for globally scheduling garbage collection in a cloud computing system. As shown, FIG. 2 includes a client computer system 210A and a cloud computer system 220, which each may correspond to the computer system 100, as described with respect to FIG. 1. As such, the client computer system 210A may comprise any type of computer system (e.g., a desktop, laptop, smartphone, tablet, and so forth) running any type of operating system (e.g., MICROSOFT® WINDOWS®, GOOGLE™ CHROME OS™, APPLE® MACOS®, and so forth). Furthermore, the client computer system 210A may comprise any computer system that is capable of communicating with cloud computer system 220. Notably, while only one client computer system 210A is shown in FIG. 2, ellipses 210B represents that any number of client computer systems may be used to practice the principles described herein.

As briefly described, the computer environment 200 includes the cloud computer system 220. The cloud computer system may comprise any type of cloud computer system that allows users to store and/or generate data within the cloud computer system. For instance, the cloud computer system 220 may comprise MICROSOFT AZURE®, AMAZON WEB SERVICES®, GOOGLE CLOUD PLATFORM™, and so forth. Accordingly, while only one cloud computer system 220 is shown for ease of explanation, one of skill in the art will understand that in many embodiments the cloud computer system may comprise any number of distributed computer systems that can singly, or in combination, be used to practice the principles described herein. As illustrated, the cloud computer system 220 includes various modules or engines and/or functional blocks that may be used to perform various operations with respect to data of the cloud computer system, as further described herein. The various engines and/or functional blocks of the cloud computer system 220 may be implemented on a local computer system of the cloud computer system 220 or may be implemented in a distributed fashion across any number of distributed computer systems of the cloud computer system 220. Accordingly, the embodiments disclosed herein are not limited by the number of computer systems that are used to implement the embodiments.

The various modules and/or functional blocks of the cloud computer system 220 may be implemented as software, hardware, or a combination of software and hardware. Notably, the cloud computer system computer system 220 may include more or less than the modules/functional blocks illustrated in FIG. 2. Additionally, some of the modules/ functional blocks may be combined as circumstances warrant. Although not illustrated, the various modules/functional blocks of the cloud computer system 220 may access and/or utilize a processor and memory, such as processor 102 and memory 104, as needed to perform their various functions.

As illustrated, the cloud computer system 220 may include a front end module 230. In operation, the front end module 230 may receive requests from the client 210A and/or clients 210B to perform actions such as a read, a write, or a delete of some data objects stored by the cloud computer system 220.

The cloud computer system 220 may also include a partition module 240. As illustrated, the partition module 240 may include a partition 241, a partition 242, and any number of additional partitions as illustrated by the ellipses 243, which in some embodiments may number in the tens of thousands or more. As further illustrated, the partition 241 includes or otherwise has access to a data map 244, an occupancy index 245 and a garbage collector 246. The partition 242 includes or otherwise has to access a data map 247, an occupancy index 248, and a garbage collector 249. Although not illustrated, any of the additional partitions 243 may also include or otherwise has access to a data map, an occupancy index, and a garbage collector. The partition module 240 may receive the requests from the front end module 230 and may direct that the operations specified in the requests be performed. The operation of the various partitions 241-243 will be described in more detail to follow.

The cloud computer system 220 may also include a storage module 250. As illustrated, the storage module 250 may include various data blocks such as data blocks 251, 252, and any number of additional data blocks as illustrated by ellipses 253, which is some embodiments may number in the hundreds of thousands or more. The data blocks may be a fixed size, such as 0.25 to 3 GB, although they may be other sizes as well. The data blocks 251, 252, and 253 may include or store various data objects. For example, the data block 251 may include or store data objects 251A-251D and the data block 252 may include or store data objects 252A-252D. The data objects 251A-251D and/or the data objects 252A-252D may be related to each other such as being portions of a single data object or alternatively, they may be unrelated separate data objects.

The data objects may include any type of reasonable data. For example, in one embodiment, the data objects may be a Binary Large Object (BLOB), such as block blobs, page blobs, or files. In other embodiments, the data objects may be file tables or the like or may be other reasonable data types. Accordingly, the embodiments disclosed herein are not limited by the data type of the implemented data objects. As also illustrated, the storage module 250 includes a storage disk or node 254 and any number of additional storage disks or nodes as illustrated by the ellipses 255. The storage disks or nodes host or support the various data blocks 251, 252, and 253. It will be appreciated that the storage disks 254 and 255 may include numerous storage arrays and may be distributed as circumstances warrant.

Figure 3:
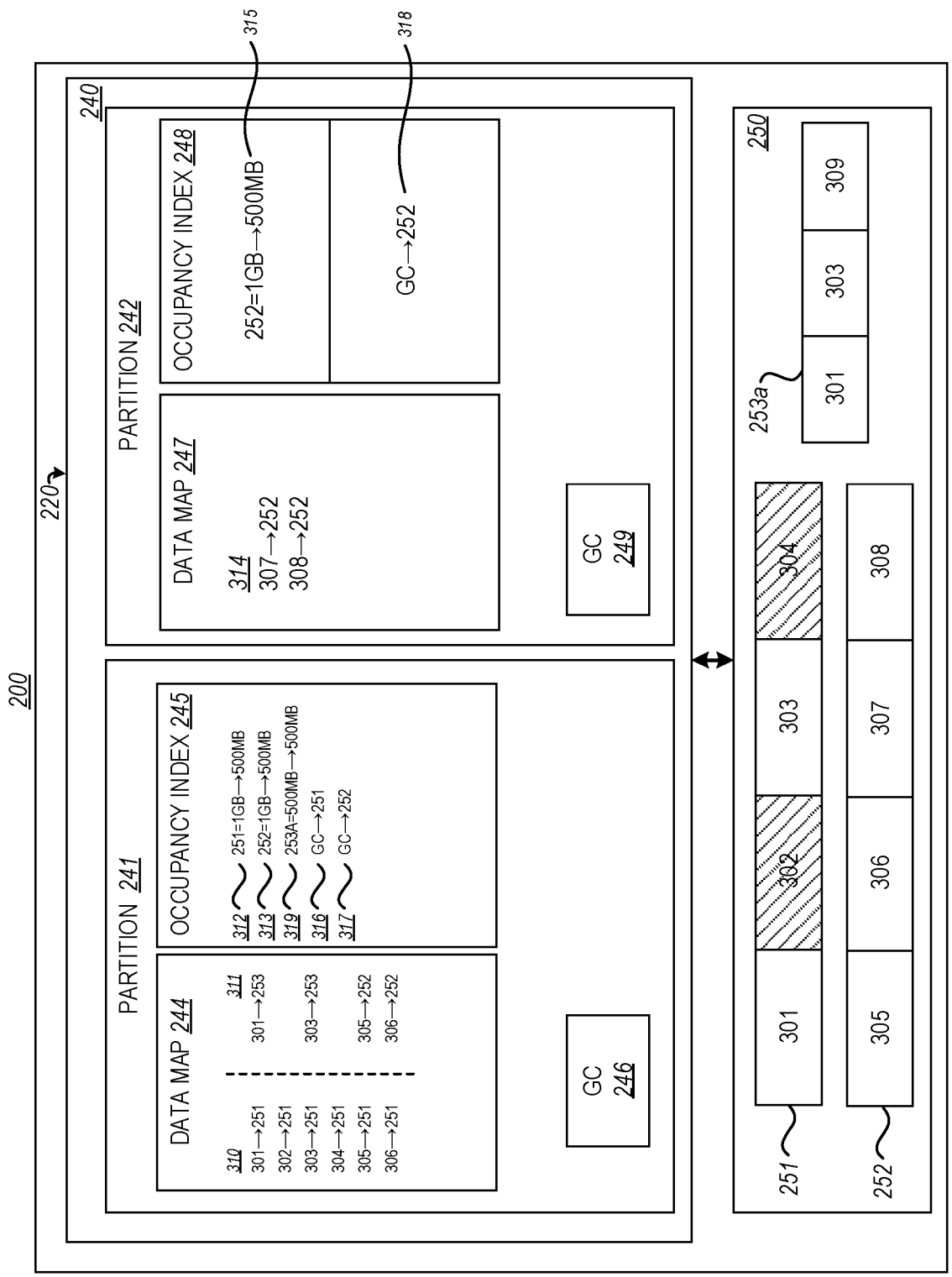
FIG. 3 illustrates an alternative view of the example cloud computer system focusing on the partition module and the storage module.

FIG. 3 illustrates an alternative view of the cloud computer 220 focusing on the partition module 240 and the storage module 250. As shown, the data block 251 includes data objects 301-304, which may correspond to the data objects 251A-251D. The data block 252 includes data objects 305-308, which may correspond to the data objects 252A-252B.

As described previously, the partition 241 may include a data map 244 that points to or references various data blocks and data objects. It will be appreciated that the data blocks discussed herein function as a container for the data objects discussed herein. As illustrated in FIG. 3 at 310, the data map 244 shows a pointer for the data object 301, 302, 303 and 304 to the data block 251 and a pointer for the data objects 305 and 306 to the data block 252. In other words, the data map 244 points to or maps the location of each of the data objects 301-306 in the storage module 250. In like manner, the data map 247 of the partition 242 shows a pointer for the data objects 307 and 308 to the data block 252 as shown at 314. Thus, the data map 247 points to or maps the location of each of the data objects 307-308 in the storage module 250. It will be appreciated that the mapping shown in FIG. 3 is for use in explaining the embodiments disclosed herein and is not meant to imply any specific type of mapping. Accordingly, the embodiments disclosed herein are not limited by any particular type of mapping implemented by the partitions 241-243.

As also previously described, the partition 241 may also include or have access to the occupancy index 245 and the garbage collector 246. In operation, the partition 241 uses the occupancy index 245 to keep track of the occupancy of the data blocks (i.e., data blocks 251 and 252) that include the data objects that are referenced by the partition 241. This information may then be used to schedule the garbage collector 246 to perform garbage collecting. For example, suppose that the data block 251 is 1 GB and further suppose that each of the data objects 301-304 is 250 MB. In operation, the partition 241 may indicate in the occupancy index 245 that the data block 251 is 1 GB and that it is occupied by 1 GB of data objects. In such instance, there may be no need for garbage collection to occur since the data block 251 is being efficiently used. It will be appreciated that the occupancy index 245 may include numerous additional entries besides those shown in FIG. 3.

As further described previously, the partition module 240 may receive a request such as read, write, update or delete from the client 210A or 210B. The partition module 240 may then direct the request to the proper partition based on the mapping of the partition. For, example, suppose that the client 210A sends one or more requests to delete the data objects 302 and 304 that are included in the data block 251. In such case, the requests may be directed to the partition 241 since it includes the key range that maps to the data objects 302 and 304. The partition 241 may direct that the storage module 250 delete the data objects 302 and 304 as shown by the hashed lines in FIG. 3. In some embodiments, such as those that are implemented in an append only system, the delete will be performed by changing the pointers to the data objects so they no longer point or map to the data objects. For example, as shown at 311, the data map 244 may be updated to so that it no longer points to or maps to the data objects 302 and 304.

The partition 241, in one embodiment, may periodically update the occupancy index 245 to reflect changes to the occupancy. For example, the partition 241 may update the occupancy index 245 to reflect that the data objects 302 and 304 have been deleted. As shown at 312, the occupancy index 245 may be updated to reflect that while the data block is 1 GB, it only has 500 MB, the 250 MB of data objects 301 and 303, currently being used. In such case, the partition 241 may, as indicated at 316, schedule the garbage collector 246 to garbage collect the data block 251.

Having the partition 241 update the occupancy index after every request to modify a data block may result in a large use of memory resources and system resources. Accordingly, in an alternative embodiment the storage module 250 may include a partition index (not illustrated) that is modified when there are changes to the data blocks, for example when the data objects 302 and 304 are deleted the pointers in the partition index are modified to no longer point or map to the data objects. Then during the garbage collection operation, the garbage collector 246 may scan the partition index to determine valid data objects. The garbage collector 246 may then update the occupancy index 245 as needed.

In one embodiment, such as in an append only system, the garbage collector 246 may scan the occupancy index 245 and determine that a garbage collection has been scheduled in the manner described. The garbage collector 246 may then rewrite or copy the data objects 301 and 303 to a data block 253A, which is an example of one of the additional data blocks 253, and may cause the pointers in the data map 244 to be updated to reflect this as illustrated at 311. The garbage collector may then inform the storage module 250 that the data block 251 is now available to be used by other partitions to write data objects to. In this manner, the cloud computer system 220 may recover the 500 MB that were no longer being used in the data block 251 and put it to a more efficient use.

In addition, as shown at 319 the partition 241 may update the occupancy index 245 to reflect that the data objects 301 and 303 are now included in the data block 253A. In the illustrated embodiment, the data block 253A is 600 MB and so the occupancy index shows that 500 MB (i.e., 250 MB for each of the data objects 301 and 303) is being used, leaving a 100 MB unused space which is shown at 309. In this case, the partition 241 may not schedule garbage collection of the data block 253A since most of the data block is being used.

In some embodiments a data block may be shared by two or more partitions. That is, two or more partitions may reference data objects that are included or stored in the same data block. This may occur when a single partition is divided by the partition module 240 for load balancing purposes. It may also occur for other reasonable reasons. For example, FIG. 3 shows that the partition 241 and 242 both reference data objects included in the data block 252 as previously discussed. In such embodiments, the partitions 241 and 242 are typically not aware of each other as partitions are independent of each other. Accordingly, each of the partitions may schedule unneeded garbage collecting because they do not know the occupancy of the other partition.

For example, suppose that the data block 252 is 1 GB and further suppose that each of the data objects 305-308 is 250 MB. When the partition 241 updates the occupancy index 245, it may determine, as shown at 313, that while the data block is 1 GB, it only has 500 MB, the 250 MB of data objects 305 and 306, currently being used since it is not aware that the partition 242 is using the other 500 MB. The partition 241 may then schedule, as shown at 317, the garbage collector 246 to perform a garbage collection operation on the data block 252 to recover the supposedly unused disk space.

Likewise, when the partition 242 updates the occupancy index 248, it may determine, as shown at 315, that while the data block is 1 GB, it only has 500 MB, the 250 MB of data objects 307 and 308, currently being used since it is not aware that the partition 241 is using the other 500 MB. As a result, it may also schedule, as shown at 318, the garbage collector 249 to perform a garbage collection operation on the data block 252 to recover the supposedly unused disk space. It will be appreciated that the occupancy index 248 may include numerous additional entries besides those shown in FIG. 3.

As will be appreciated, having both the garbage collectors 246 and 249 attempt to perform the unneeded garbage collection operations is a waste of system resources as it does not result in any disk space recovery for the system to use. For example, in an append only system, when doing garbage collection, the garbage collector 246 may rewrite the data objects 305 and 306 to an unused one of the data blocks 253 and the garbage collector 249 may rewrite the data objects to a different unused one of the data blocks 253. Performing both of the data rewrites may use system resources such as processing resources, system I/O resources, and system bandwidth without resulting in any real disk space recovery. Advantageously, the embodiments disclosed herein provide for a global occupancy aggregator module or engine that is able to perform global scheduling of the various garbage collection operations to thereby ensure efficient garbage collection by the various partitions of the cloud computer 220.

Returning to FIG. 2, it shown that the cloud computer system 220 includes the global occupancy aggregator 260. Although the global occupancy aggregator 260 is shown as being a separate module or functional block, this is for ease of explanation only. In some embodiments, the global occupancy aggregator 260 may be part of the partition module 240 or the storage module 250. In other embodiments, the global occupancy aggregator 260 may be distributed across various modules as circumstances warrant.

In operation, the global occupancy aggregator 260 may be able to access the occupancy indexes of the partitions 241-243 (i.e., occupancy index 245, occupancy index 248 and the non-illustrated occupancy indexes of the various partitions 243) to generate a global occupancy index. The global occupancy aggregator 260 may then use the global occupancy information to determine which partitions and data blocks to schedule garbage collection for. The global garbage collection schedule may then be fed to the various garbage collectors, which will then follow the global schedule instead of any garbage collection schedule that may be implemented locally by the partitions. In some embodiments, the operation of the global occupancy aggregator 260 is set to run at regular intervals, such as once per hour, although other reasonable intervals may also be implemented, to ensure continuous global garbage collection scheduling without putting an undue burden on system resources. The operation of the global occupancy aggregator 260 will be now be explained in more detail.

Figure 4:
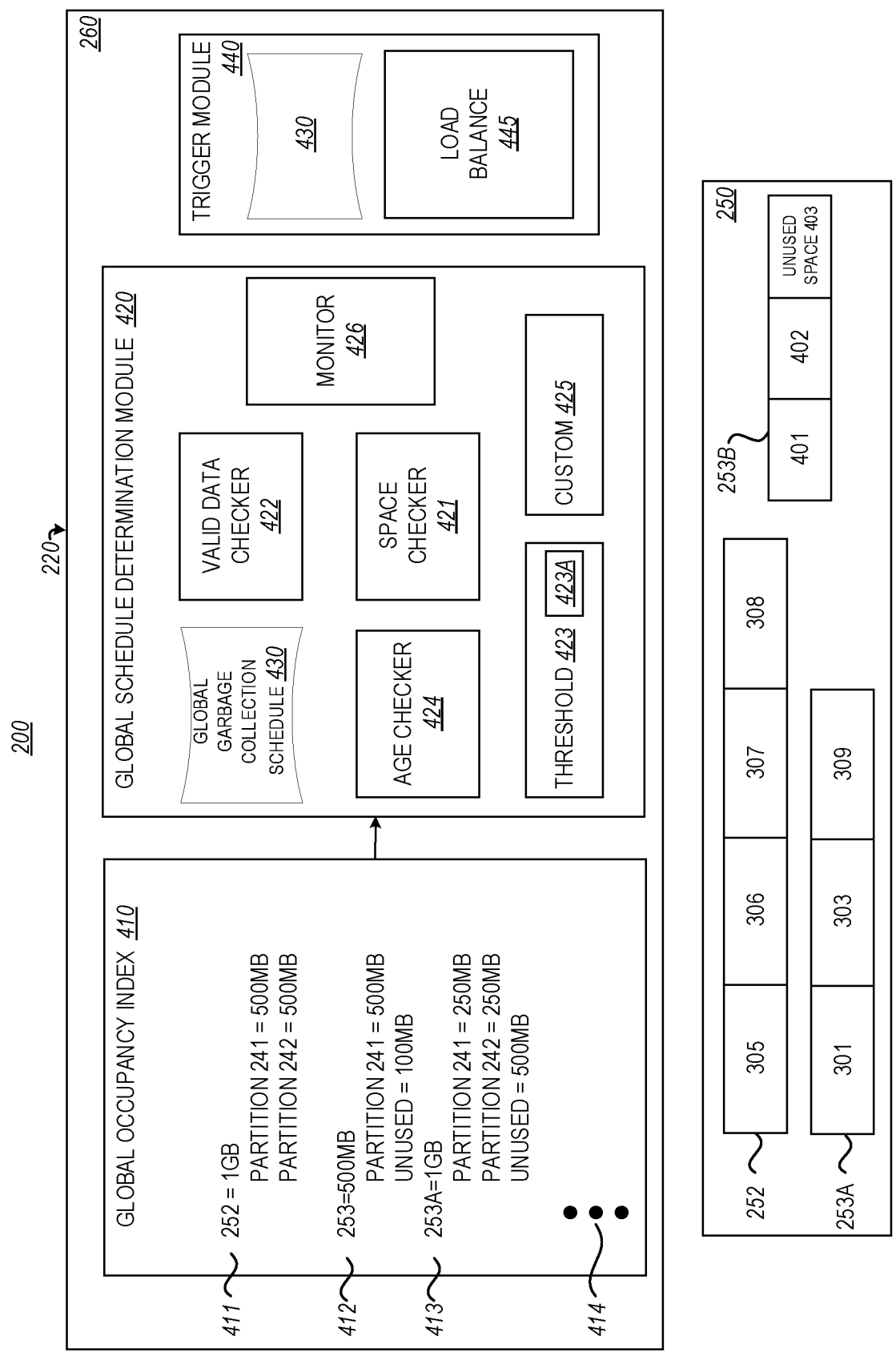
FIG. 4 illustrates a further alternative view of the example cloud computer system focusing on the storage module and the global occupancy aggregator.

FIG. 4 illustrates an alternative view of the cloud computer 220 focusing on the storage module 250 and the global occupancy aggregator 260. As shown, the global occupancy aggregator 260 may include or otherwise have access to a global occupancy index 410. The global occupancy aggregator 260 may access the occupancy indexes of the partitions 241-243 to generate the global occupancy index 410. In some embodiments, the global occupancy aggregator 260 may query the partitions for their respective occupancy indexes while in other embodiments the partitions may send the occupancy index information to the global occupancy aggregator 260 at certain intervals or in response to certain triggers. Other embodiments may combine both of these actions.

For example, the global occupancy aggregator 260 may access the occupancy index 245 of partition 241 and the occupancy index 248 of partition 242. As mentioned previously, the occupancy indexes 245 and 248 show the data block 252 as only having 500 MB of its 1 GB being used. However, the global occupancy aggregator 260 may aggregate the occupancies of the data block 252 to determine that the entire 1 GB is being used. As shown at 411, this may be entered into the global occupancy index, where it shows 500 MB being used by partition 241 and 500 MB being used by partition 242.

The global occupancy index 410 may also include additional occupancy information obtained from the various partitions 241-243. As shown in FIG. 4 at 412, the occupancy information 319 of the data block 253A is included in the global occupancy index 410. Since the data block 253A is 600 MB and the data objects 301 and 303 are 250 MB, the global occupancy index 410 shows that 500 MB of the data block is being used by the partition 241 and 100 MB is the unused space 309.

FIG. 4 shows a data block 253B, which is an example of the additional data blocks 253. The data block 253 includes a data object 401 and 402 and an unused space 403. Suppose that the data block 253B is 1 GB and that data objects 401 and 402 are each 250 MB. Although not illustrated in FIG. 3, suppose that data object 401 is included in partition 241 and thus is included in data map 244 and occupancy index 245 and suppose that that data object 402 is included in partition 242 and thus is included in data map 247 and occupancy index 248. As shown at 413, the global occupancy index may show the occupancy of the data block 253B as 250 MB being by partition 241, 250 MB being used by partition 242, and 500 MB as being unused space 403.

For ease of explanation, this disclosure has only discussed the global occupancy aggregator 260 accessing the occupancy information for the partitions 241 and 242 and recording this information in the global occupancy index 410. However, it will be noted that in most implementations, there may be tens of thousands of the additional partitions 243, each having hundreds of thousands or more data blocks, that will also be accessed by the global occupancy aggregator 260 to obtain their local occupancy information. This occupancy information will then be recorded in the global occupancy index 410 as illustrated by the ellipses 414.

The global occupancy aggregator 260 may also may include or otherwise have access to a global schedule determination module 420. In operation, the global schedule determination module 420 may determine a global garbage collection schedule 430 based on the global occupancy index 410 that may be used by the various garbage collectors of each partition. The global garbage collection schedule 430 may list those data blocks 251-253 and the partitions 241-243 that reference the data blocks that should be subjected to garbage collection. Since the global schedule determination module 420 has access to the global occupancy index 410, it is able to determine which of the data blocks would be best to perform garbage collection on. This determination may be based on one or more determination or filtering operations that help to determine which data blocks to garbage collect. Thus, the embodiments disclosed herein are not limited by the types and number of determination operations that are implemented. Examples of the determination operations will now be explained.

As shown in FIG. 4 the global schedule determination module 420 may include a space checker module 421 that in operation is configured determine the amount of unused space for each data block and to use this information in determining if a data block should be included in the global garbage collection schedule 430. For example, the space checker module 421 may determine based on the global occupancy index 410 that the entire 1 GB of the data block 252 is being used by the both the partition 241 and the partition 242. Unlike the case previously described where each individual partition determines that only half of the data block is being used and thus schedules garbage collection, the global schedule determination module 420 may determine that the data block 252 is being efficiently used and thus should not be included in the global garbage collection schedule 430.

However, the space checker module 421 may determine based on the global occupancy index 410 that the data block 253B has half of its space being unused and that the data block 253A also has some unused space. Accordingly, the global schedule determination module 420 may determine that the data block 253B should be included in the global garbage collection schedule 430 since it includes a large amount of unused space and thus may use less resources when being subjected to garbage collection and that the data block 253A should not be included in the global garbage collection schedule 430 since it only includes a small amount of unused space.

In some embodiments, the space checker module 421 may also determine the relative size of each of the data blocks included in the global occupancy index 410. In such embodiments, global schedule determination module 420 may determine to include smaller data blocks such as the data block 253A in the global garbage collection schedule 430 as a smaller data block may use less resources when being subjected to a garbage collection.

The global schedule determination module 420 may also include a valid data checker module 422 that in operation is configured to determine the amount of data in each data block that is valid. For example, in some instances one or more of the data objects 305-308 of data block 252 may become invalid for some reason such as being deleted or the like. Thus, even though a particular partition is still listing the data object in its occupancy index, the data object may actually no longer be valid. In one embodiment the data checker module 422 may determine those data blocks with a large amount of valid data and invalid data. In an alternative embodiment, the garbage collectors 246 and 249 may determine those data blocks with a large amount of valid data and invalid data when scanning the partition index in the manner previously described. This information may then be provided to the data checker module 422. The global schedule determination module 420 may then include those data blocks with a large amount (or even any amount) of invalid data in the global garbage collection schedule 430 since data blocks with invalid data are prime subjects for garbage collection to recover the data blocks space.

The global schedule determination module 420 may also include an occupancy threshold module 423 that is used for specifying a threshold 423A for garbage collection. In operation, the occupancy threshold module 423 may determine or may be used by the client 210A to specify the occupancy threshold 423A for garbage collection. The occupancy threshold 423A may be a value where below which garbage collection is performed on a data block. For example, suppose the occupancy threshold 423A is set to 89%. In such case, any data block included in the global occupancy index 410 having less than 89% of valid data or having less than 89% occupied space may be added to the global garbage collection schedule 430 so that these data blocks are garbage collected. It will be appreciated that the occupancy threshold 423A may be set to any desired value as circumstances warrant. Thus, in some embodiments it may be desirable to have an occupancy threshold 423A less than 89% or greater than 89%.

The global schedule determination module 420 may also include an age checking module 424 that in operation is configured to determine an age of each of the data blocks included in the global occupancy index 410. As may be appreciated, the older a data block is the more likely it is that the data objects included in the data block may have become invalid or otherwise no longer of use to the clients 210A or 210B. For example, suppose the data block 252 was determined to be much older than the data blocks 253A and 253B by the age checker module 424. In such case, the global schedule determination module 420 may determine that the data block 252 should be added to the global garbage collection schedule 430.

The global schedule determination module 420 may also include a custom selection module 425 that in operation is configured to allow one or more of the clients 210A and 210B to specify one or more of the data blocks 251-253 to expressly include and/or to expressly exclude from the global garbage collection schedule 430. For example, there may be circumstances where one or more of the clients 210A and 210B desire that the data block 252 be subjected to garbage collection for various business reasons. Likewise, one or more of the clients 210A and 210B may desire that the data block 253A be excluded from garbage collection. Accordingly, the custom selection module 425 may generate a "force include list" that includes the data block 252 and any other data block that has been specified to be subjected to garbage collection. Likewise, a "force exclude list" may be generated that includes the data block 253A and any other data block that has been specified to be excluded from garbage collection. The global schedule determination module 420 may use the "force include list" and the "force exclude list" when determining the data blocks that should be added to the global garbage collection schedule 430.

In some embodiments, the global schedule determination module 420 may also include a monitor module 426. In operation, the monitor module 426 is able to trigger a global occupancy index 410 update if the scheduled update is not frequent enough for the global schedule determination module 420 to perform its task of generating the global garbage collection schedule 430. The monitor module 426 may also specify a maximum data rewrite at any given time when garbage collecting in the global garbage collection schedule 430 to help ensure that system resources are not overtaxed. The monitor module 426 may also provide other monitoring services as needed.

Based on the various determination operations described as well as others that have not been described, the global schedule determination module 420 may generate the global garbage collection schedule 430. The global schedule determination module 420 may use all or only a subset of the various determination operations when generating the global garbage collection schedule 430. In addition, the global schedule determination module 420 may try multiple different variations and iterations of the various determination operations before arriving at an acceptable global garbage collection schedule 430. Thus, the global schedule determination module 420 is able to apply aspects of iterative learning to determine the acceptable global garbage collection schedule 430.

The global occupancy aggregator 260 may also may include or otherwise have access to a trigger module 440. As illustrated, the trigger module 440 may receive the global garbage collection schedule 430 from the global schedule determination module 420. In operation, the trigger module 440 may provide the global garbage collection schedule 430 to the various garbage collectors such as garbage collector 246 and 249. The garbage collectors may then perform the garbage collection specified in the global garbage collection schedule 430. This garbage collection may be according to any reasonable garbage collection such as the garbage collection previously described in relation to FIG. 2.

In some embodiments, the trigger module 440 may include a load balance module 445. In operation, the load balance operation may stagger the triggering of the garbage collection according to the global garbage collection schedule 430 across the various partitions. That is, the load balance module 445 ensures that all of the partitions are not garbage collecting at the same time to minimize an initial burst of load that may occur when garbage collection begins and to allow the system to gradually balance. Accordingly, the load balance module 445 may provide a command to each of the partitions informing them that they are to begin the garbage collecting.

In other embodiments, the load balancing module 445 may perform a cost analysis to determine which of the partitions to trigger garbage collection for. As previously explained, garbage collection in systems such as append only systems is performed by rewriting data from a first data block to another before the first data block is recovered. As will be appreciated, not all data objects and data blocks are the same size and thus those that are larger may require more system resources when the rewrites during garbage collection are performed. Accordingly, the load balancing module 445 may determine a cost, such as in bytes, to rewrite a data object in a new data block for every data object (or for a subset of every data object) that is scheduled for garbage collection. The load balancing module 445 may then use the cost to trigger garbage collection of those data blocks that would result in the largest number of bytes being rewritten given the current status of the system resources. That is, the load balancing module 445 may typically select the data blocks with the largest number of bytes so as to get the largest amount of rewrites as possible at a given round of garbage collecting. However, there may be instances when smaller data blocks may be selected based on the current system resources.

As may be appreciated, when two partitions share a data block that is scheduled for garbage collection, they may not perform the garbage collection at the same time. For example, suppose that data block 252 is included in the global garbage collection schedule 430, which would result in the garbage collector 246 rewriting the data blocks 305 and 306 to a new data block and the garbage collector 249 rewriting the data blocks 307 and 308 to a different new data block. Further suppose that the garbage collector 246 performed its rewrites first, but that the garbage collector 249 did not perform it garbage collection until several hours later. In such case, the data objects 305 and 306 would remain as part of the data block 252 and the new data block during the time period before the garbage collector 249 performed its garbage collection since data block 252 may be recovered until garbage collector 249 has finished its garbage collection. This may result in a temporary increase in the amount of disk space being used until the data block 252 was recovered. As may be appreciated, if such an occurrence happened to a large number of partitions at once, there may be a chance that the system could run out of memory resources for writing new data objects.

Accordingly, in some embodiments, the load balancing module 445 may specify a total amount of rewrites that may occur during a round of garbage collecting. In one embodiment, this may be 200 TB. In this way, the load balancing module 445 ensures that the amount of memory resources that may be rewritten to during any round of garbage collection is an amount that may be supported by the system.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
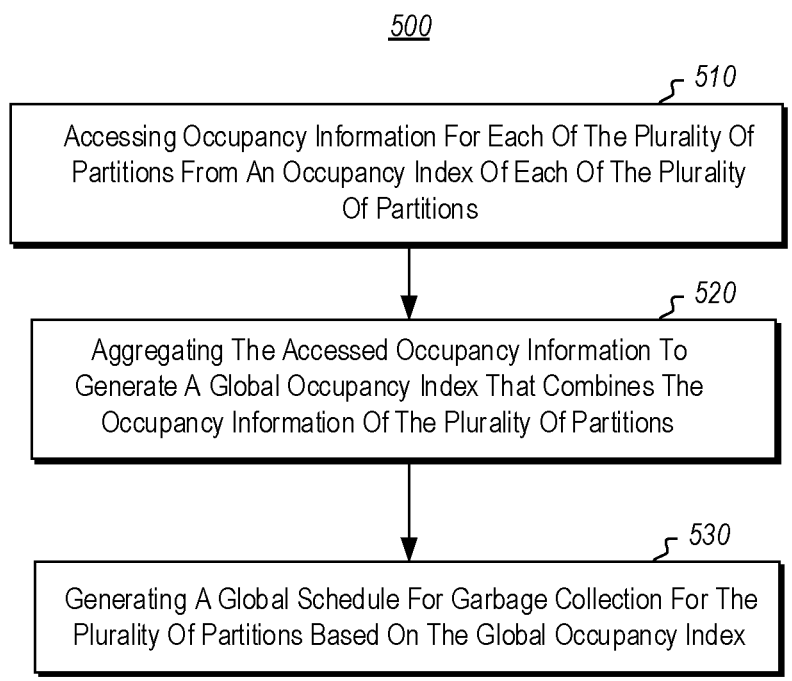
FIG. 5 illustrates a flowchart of a method for scheduling garbage collection in a distributed environment that includes a plurality of partitions that reference a plurality of data blocks that store data objects.

FIG. 5 illustrates a flow chart of an example method 500 for scheduling garbage collection in a distributed environment that includes a plurality of partitions that reference a plurality of data blocks that store data objects. The method 500 will be described with respect to one or more of FIGS. 2-4 discussed previously.

The method 500 includes occupancy information for each of the plurality of partitions from an occupancy index of each of the plurality of partitions (act 510). The occupancy information specifies a portion of storage resources occupied by those of the plurality of data blocks referenced by each of the plurality of partitions. For example, as previously described the global occupancy aggregator 260 may access occupancy information from the occupancy index 245 of the partition 241, the occupancy index 248 of the partition 242, and the non-illustrated occupancy indexes of the additional 243.

As previously described the occupancy information specifies a portion of storage resources occupied by those of the plurality of data blocks referenced by each of the plurality of partitions. For example, the occupancy information 313 shows that the data block 252 is 1 GB and includes 500 MB of data objects referenced by the partition 241 (i.e., data objects 305 and 306). Likewise the occupancy information 315 shows that the data block 252 is 1 GB and includes 500 MB of data objects referenced by the partition 242 (i.e., data objects 307 and 308). The occupancy information 312 and 319 show similar information.

The method 500 includes aggregating the accessed occupancy information to generate a global occupancy index that combines the occupancy information of the plurality of partitions (act 520). For example, as previously described the global occupancy aggregator 260 aggregates the occupancy information from the occupancy indexes of the various partitions to generate the global occupancy index 410. As also previously described, the global occupancy index 410 combines the occupancy information for the all of the partitions. For example, the global occupancy index 410 shows at 411 that the data block 252 is 1 GB and that 500 MB are referenced by partition 241 and the other 500 MB is referenced by the partition 242.

The method 500 includes generating a global schedule for garbage collection for the plurality of partitions based on the global occupancy index (act 530). The global schedule specifies which of the plurality of data blocks included in the global occupancy index are to be subjected to garbage collection. For example, as previously described the global occupancy aggregator 260 generates the global garbage collection schedule 430. The global occupancy aggregator 260 may use the various determination operations as previously described to determine which of the data blocks 251-253 should be included in the global garbage collection schedule 430. In this way, the global occupancy aggregator 260 is able to determine an acceptable garbage collection schedule that may be used to schedule garbage collection by the garbage collectors of each partition such as the garbage collectors 246 and 249.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable storage media having stored thereon computer-executable instructions that are executable by the one or more processors to cause the computer system to perform at least the following:
access a plurality of partitions in a distributed system that point to a plurality of data blocks that store data objects, each of the plurality of partitions having a garbage collector that performs garbage collection independent of any garbage collection performed by the garbage collectors of the other partitions; and
determine when each of the garbage collectors of the plurality of partitions are to perform garbage collection on the plurality of data blocks that the partitions point to, the determination at least partially based on a global schedule for garbage collection that specifies an optimized order for garbage collection by the garbage collectors of each of the plurality of partitions.

2. The computer system of claim 1, wherein the global schedule for garbage collection is based on a global occupancy index that specifies occupancy of the data objects in the plurality of data blocks.

3. The computer system of claim 1, wherein the computer system is further caused to perform the following:
trigger the garbage collectors of the plurality of partitions to perform the garbage collection on the plurality of data blocks specified by the global schedule for garbage collection.

4. The computer system of claim 1, wherein the global schedule for garbage collection specifies an optimized order by specifying an age of each of plurality of data blocks, wherein those of the plurality of data blocks that are older than the other data blocks are included in the global schedule.

5. The computer system of claim 1, wherein the global schedule for garbage collection specifies an optimized order by specifying an amount of unused space for each of the plurality of data blocks, wherein those of the plurality of data blocks with a large amount of unused space are included in the global schedule.

6. The computer system of claim 1, wherein the global schedule for garbage collection specifies an optimized order by specifying an amount of valid data objects for each of the plurality of data blocks, wherein those of the plurality of data blocks with a large amount of invalid data objects are included in the global schedule.

7. The computer system of claim 1, wherein the global schedule for garbage collection specifies an optimized order by specifying a threshold for garbage collection, wherein those of the plurality of data blocks having an amount of valid data below the threshold are included in the global schedule.

8. The computer system of claim 1, wherein the computer system is further caused to perform the following:
receive an indication that one or more of the plurality of data blocks are to be included in the global schedule; and
based on the indication, add the one or more of the plurality of data blocks to the global schedule.

9. The computer system of claim 1, wherein the plurality of data blocks include one or more of a Binary Large Object (BLOB), a file, a table, or an index.

10. A method for scheduling garbage collection in a distributed environment that includes a plurality of partitions that point to a plurality of data blocks that store data objects, the method comprising:
accessing the plurality of partitions that point to the plurality of data blocks that store data objects, each of the plurality of partitions having a garbage collector that performs garbage collection independent of any garbage collection performed by the garbage collectors of the other partitions; and
determining when each of the garbage collectors of the plurality of partitions are to perform garbage collection on the plurality of data blocks that the partitions point to, the determination at least partially based on a global schedule for garbage collection that specifies an optimized order for garbage collection by the garbage collectors of each of the plurality of partitions.

11. The method of claim 10, further comprising:
triggering the garbage collectors of the plurality of partitions to perform the garbage collection on the plurality of data blocks specified by the global schedule for garbage collection.

12. The method of claim 11, wherein the act of triggering comprises performing a cost analysis to determine which of the garbage collectors to trigger.

13. The method of claim 11, wherein the act of triggering the garbage collectors is staggered such that not all of the garbage collectors begin garbage collecting at the same time.

14. The method of claim 10, wherein the global schedule for garbage collection specifies an optimized order by specifying an age of each of plurality of data blocks, wherein those of the plurality of data blocks that are older than the other data blocks are included in the global schedule.

15. The method of claim 10, wherein the global schedule for garbage collection specifies an optimized order by specifying an amount of unused space for each of the plurality of data blocks, wherein those of the plurality of data blocks with a large amount of unused space are included in the global schedule.

16. The method of claim 10, wherein the global schedule for garbage collection specifies an optimized order by specifying an amount of valid data objects for each of the plurality of data blocks, wherein those of the plurality of data blocks with a large amount of invalid data objects are included in the global schedule.

17. The method of claim 10, wherein the global schedule for garbage collection specifies an optimized order by specifying a threshold for garbage collection, wherein those of the plurality of data blocks having an amount of valid data below the threshold are included in the global schedule.

18. The method of claim 10, further comprising:
receiving an indication that one or more of the plurality of data blocks are to be included in the global schedule; and
based on the indication, adding the one or more of the plurality of data blocks to the global schedule.

19. A computer system comprising:
one or more processors; and
one or more computer-readable storage media having stored thereon computer-executable instructions that are executable by the one or more processors to cause the computer system to instantiate in memory:
a global occupancy aggregator component that is configured to schedule garbage collection in a distributed environment that includes a plurality of partitions that point to a plurality of data blocks that store data objects, the global occupancy aggregator configured to perform at least the following:
access the plurality of partitions that point to the plurality of data blocks that store data objects, each of the plurality of partitions having a garbage collector that performs garbage collection independent of any garbage collection performed by the garbage collectors of the other partitions; and
determine when each of the garbage collectors of the plurality of partitions are to perform garbage collection on the plurality of data blocks that the partitions point to, the determination at least partially based on a global schedule for garbage collection that specifies an optimized order for garbage collection by the garbage collectors of each of the plurality of partitions.

20. The computer system of claim 19, wherein the computer system is further configured to instantiate in memory:
a trigger component configured to trigger the garbage collectors of the plurality of partitions to perform the garbage collection on the plurality of data blocks specified by the global schedule for garbage collection.

* * * * *